US010347132B1

(12) United States Patent
Chandrakumar et al.

(10) Patent No.: US 10,347,132 B1
(45) Date of Patent: Jul. 9, 2019

(54) ADJACENT PEDESTRIAN COLLISION MITIGATION

(71) Applicant: GM GLOBAL TECHNOLOGY OPERATIONS LLC, Detroit, MI (US)

(72) Inventors: Janakan Chandrakumar, Ottawa (CA); Benjamin J. Gaffney, Markham (CA); Reza Zarringhalam, Waterloo (CA)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 16/174,397

(22) Filed: Oct. 30, 2018

(51) Int. Cl.
| G08G 1/00 | (2006.01) |
| G08G 1/16 | (2006.01) |
| G08G 1/005 | (2006.01) |
| B60Q 5/00 | (2006.01) |
| B60T 7/22 | (2006.01) |
| B60Q 1/52 | (2006.01) |

(52) U.S. Cl.
CPC .............. *G08G 1/166* (2013.01); *B60Q 1/525* (2013.01); *B60Q 5/006* (2013.01); *B60T 7/22* (2013.01); *G08G 1/005* (2013.01); *B60T 2210/32* (2013.01)

(58) Field of Classification Search
CPC ........ G08G 1/166; G08G 1/005; B60Q 5/006; B60Q 1/525; B60T 7/22; B60T 2210/32
USPC .......................................... 340/904, 435, 436
See application file for complete search history.

(56) References Cited

U.S. PATENT DOCUMENTS

| 2010/0253493 | A1* | 10/2010 | Szczerba | G01S 13/723 340/435 |
| 2011/0128161 | A1* | 6/2011 | Bae | B60Q 1/506 340/901 |
| 2013/0325202 | A1* | 12/2013 | Howard | B60W 30/08 701/1 |
| 2018/0050635 | A1* | 2/2018 | Vincent | B60Q 5/006 |
| 2018/0162388 | A1* | 6/2018 | You | B60Q 1/525 |
| 2019/0031161 | A1* | 1/2019 | Ji | B60W 10/184 |

OTHER PUBLICATIONS

Nhtsa, "Traffic Safety Facts: 2016 Data", Mar. 2018 (Revised), pp. 1-10.

\* cited by examiner

*Primary Examiner* — Anh V La

(57) ABSTRACT

One general aspect includes a system to send a distress notification, the system including a memory configured to include one or more executable instructions and a processor configured to execute the executable instructions, where the executable instructions enable the processor to: receive pedestrian movement information from a pedestrian detection sensor; receive third-party vehicle movement information from a vehicle detection sensor; and based at least in part on both the pedestrian movement information and third-party vehicle movement information, provide a collision warning notification.

19 Claims, 5 Drawing Sheets

ADJACENT PEDESTRIAN COLLISION MITIGATION

INTRODUCTION

Pedestrian crashes have become deadlier and more frequent. The increase has been mostly in urban or suburban areas, on busy main roads and away from any intersections. In 2016, for example, approximately 6,000 pedestrians were killed in vehicle crashes, which accounted for 16% of the vehicle crash fatalities for the year. Furthermore, approximately 75% of these fatalities occurred when the pedestrian was walking across the road at a non-intersection location (e.g., when the pedestrian was crossing the road from the front of a parked car where they are visibly blocked from the view of oncoming traffic). Thus, it is desirable to reduce pedestrian fatalities of this nature. Accordingly, the system and method presented herein will allow for vehicles to attempt to prevent nearby vehicle-pedestrian collisions by alerting the crossing pedestrian and/or oncoming vehicle of the danger before a collision occurs. Moreover, other desirable features and characteristics of the present invention will become apparent from the subsequent detailed description of the invention and the appended claims, taken in conjunction with the accompanying drawings and this background of the invention.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a system to send a distress notification, the system including: a memory configured to include one or more executable instructions and a processor configured to execute the executable instructions, where the executable instructions enable the processor to: receive pedestrian movement information from a pedestrian detection sensor; and receive third-party vehicle movement information from a vehicle detection sensor; and based at least in part on the pedestrian movement information, provide a collision warning notification. Other embodiments of this aspect include corresponding computer systems, apparatus, and computer programs recorded on one or more computer storage devices, each configured to perform the actions of the methods.

Implementations may include one or more of the following features. The system further including: receive third-party vehicle movement information from a vehicle detection sensor; and based at least in part on both the pedestrian movement information and third-party vehicle movement information, provide a collision warning notification. The system further including: based at least in part on both the pedestrian movement information and third-party vehicle movement information, calculate a time of a pedestrian-vehicle collision; based at least in part on the time of the pedestrian-vehicle collision, determine whether the pedestrian-vehicle collision is imminent; and where the collision warning notification is provided when the pedestrian-vehicle collision is determined to be imminent. The system where the collision warning notification is an audible alert generated by a horn system of a vehicle. The system where the collision warning notification is a visual alert generated by one or more headlamps of a vehicle. The system where the collision warning notification is transmitted to a third-party vehicle via a peer network. The system where the collision warning notification includes instructions configured to automatically brake the third-party vehicle. Implementations of the described techniques may include hardware, a method or process, or computer software on a computer-accessible medium.

One general aspect includes a vehicle including a control system, the control system configured to: receive pedestrian movement information from a pedestrian detection sensor; receive third-party vehicle movement information from a vehicle detection sensor; and based at least in part on the pedestrian movement information, provide a collision warning notification. Other embodiments of this aspect include corresponding computer systems, apparatus, and computer programs recorded on one or more computer storage devices, each configured to perform the actions of the methods.

Implementations may include one or more of the following features. The vehicle further including: receive third-party vehicle movement information from a vehicle detection sensor; and based at least in part on both the pedestrian movement information and third-party vehicle movement information, provide a collision warning notification. The vehicle where the control system is further configured to: based at least in part on both the pedestrian movement information and third-party vehicle movement information, calculate a time of a pedestrian-vehicle collision; based at least in part on the time of the pedestrian-vehicle collision, determine whether the pedestrian-vehicle collision is imminent; and where the collision warning notification is provided when the pedestrian-vehicle collision is determined to be imminent. The vehicle where the collision warning notification is an audible alert generated by a horn system of the vehicle. The vehicle where the collision warning notification is a visual alert generated by one or more headlamps of the vehicle. The vehicle where the collision warning notification is transmitted to a third-party vehicle via a peer network. The vehicle where the collision warning notification includes instructions configured to automatically brake the third-party vehicle. Implementations of the described techniques may include hardware, a method or process, or computer software on a computer-accessible medium.

One general aspect includes a method to send a distress notification, the method including: receiving, via a processor, pedestrian movement information from a pedestrian detection sensor; receiving, via the processor, third-party vehicle movement information from a vehicle detection sensor; and based at least in part on both the pedestrian movement information and third-party vehicle movement information, via the processor, providing a collision warning notification. Other embodiments of this aspect include corresponding computer systems, apparatus, and computer programs recorded on one or more computer storage devices, each configured to perform the actions of the methods.

Implementations may include one or more of the following features. The method further including: based at least in part on both the pedestrian movement information and third-party vehicle movement information, via the processor, calculating a time of a pedestrian-vehicle collision; based at least in part on the time of the pedestrian-vehicle collision, via the processor, determining whether the pedestrian-vehicle collision is imminent; and where the collision warning notification is provided when the pedestrian-vehicle collision is determined to be imminent. The method where the collision warning notification is an audible alert generated by a horn system of a vehicle. The method where the collision warning notification is a visual alert generated by one or more headlamps of a vehicle. The method where the collision warning notification is transmitted to a third-party vehicle via a peer network. The method where the collision warning notification includes instructions configured to automatically brake the third-party vehicle. Implementations of the described techniques may include hardware, a method or process, or computer software on a computer-accessible medium.

The above features and advantages and other features and advantages of the present teachings are readily apparent from the following detailed description for carrying out the teachings when taken in connection with the accompanying drawings.

BRIEF DESCRIPTION OF THE DRAWINGS

The disclosed examples will hereinafter be described in conjunction with the following drawing figures, wherein like numerals denote like elements, and wherein.

The above features and advantages and other features and advantages of the present teachings are readily apparent from the following detailed description for carrying out the teachings when taken in connection with the accompanying drawings.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
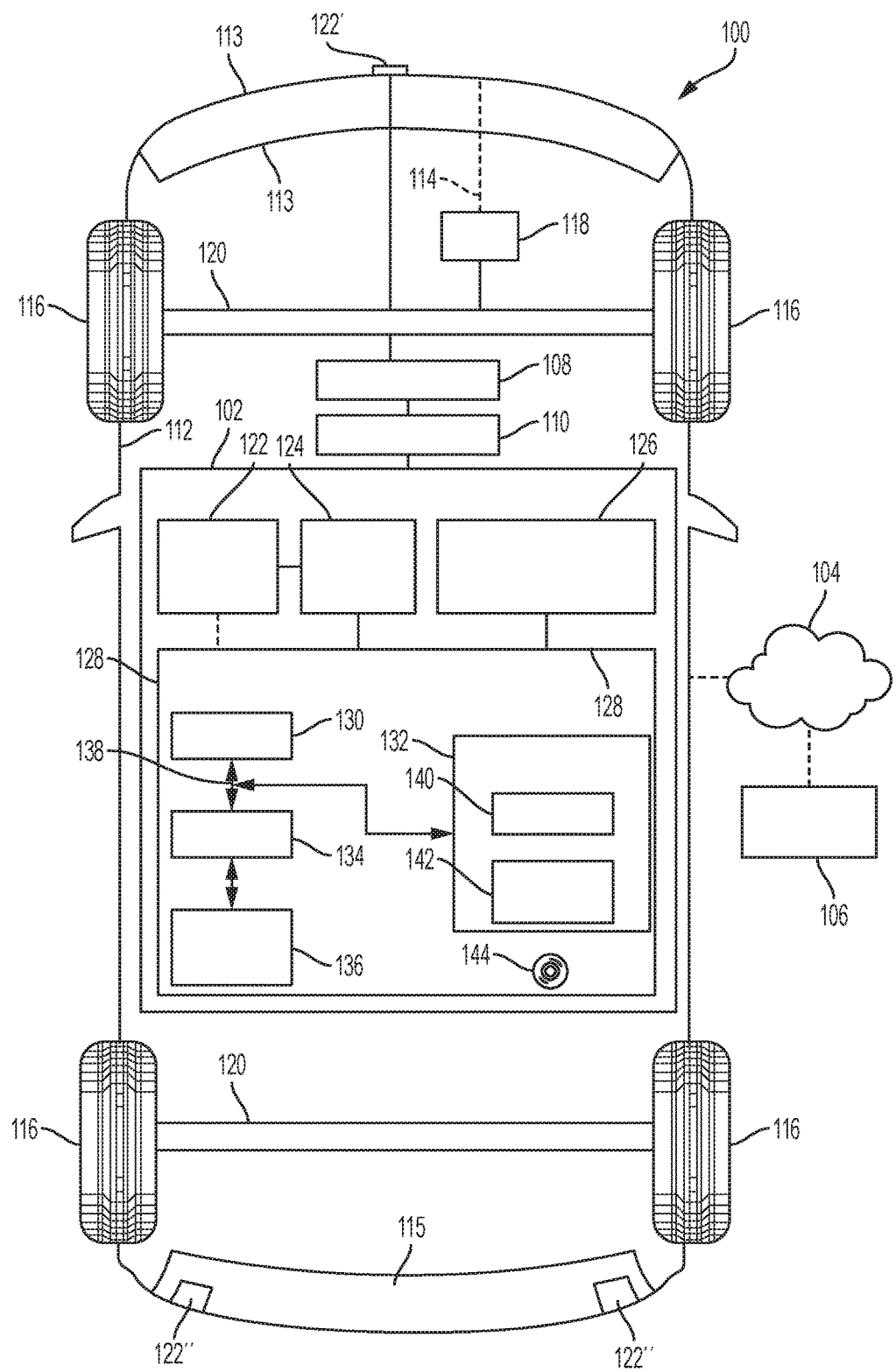
FIG. 1 is a functional block diagram of a vehicle that includes a control system for controlling and implementing a system and method to mitigate the likelihood of a pedestrian collision in accordance with one or more exemplary embodiments discussed herein.

FIG. 1 illustrates a vehicle 100, according to an exemplary embodiment. As described in greater detail further below, the vehicle 100 includes a control system 102 to mitigate the likelihood of a pedestrian collision. In various embodiments, the control system 102 facilitates communications between the vehicle 100 and a peer network 104 having various other participants 106 (e.g., other third-party vehicles 207, smart WI-FI connected infrastructure, etc.). Also in various embodiments, the control system 102 is coupled to various vehicle modules 108 (e.g., braking control, engine control, transmission control, instrument pack, infotainment module and corresponding infotainment display, heads-up display module, body control module (BCM), audio system, vehicle headlamps, horn system control, lighting, climate control, and so on, in certain embodiments) via one or more vehicle buses 110 (e.g., one or more vehicle CAN buses, in certain embodiments).

In various embodiments, the vehicle 100 comprises an automobile. The vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle or other vehicle, and/or one or more other types of mobile platforms (e.g., a robot, a ship, and so on) and/or other systems.

The vehicle's body 112 is arranged on a chassis 114. The body 112 substantially encloses other components of the vehicle 100 and includes a front bumper 113 and back bumper 115. The body 112 and the chassis 114 may jointly form a frame. The vehicle 100 also includes a plurality of wheels 116. The wheels 116 are each rotationally coupled to the chassis 114 near a respective corner of the body 112 to facilitate movement of the vehicle 100. In one embodiment, the vehicle 100 includes four wheels 116, although this may vary in other embodiments (for example for trucks and certain other vehicles).

A drive system 118 is mounted on the chassis 114, and drives the wheels 116, for example via axles 120. The drive system 118 preferably comprises a propulsion system. In certain exemplary embodiments, the drive system 118 comprises an internal combustion engine and/or an electric motor/generator, coupled with a transmission thereof. In certain embodiments, the drive system 118 may vary, and/or two or more drive systems 118 may be used. By way of example, the vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and alcohol), a gaseous compound (e.g., hydrogen and/or natural gas) fueled engine, a combustion/electric motor hybrid engine, and an electric motor.

In various embodiments, the control system 102 controls communications with the peer network 104, for example for use in performing actions respect to one or more modules 108 of the vehicle 100 (e.g., vehicle braking, body control, engine control, transmission control, infotainment control, climate control, lighting control, headlight control, horn system control, audio system control, instrument control, haptic feedback device control (e.g., piezoelectric seat/steering wheel vibratory devices), and so on), among other vehicle actions. Also in various embodiments, the control system 102 is disposed within the body 112 of the vehicle 100. In one embodiment, the control system 102 is mounted on the chassis 114. In certain embodiments, the control system 102 and/or one or more components thereof may be disposed outside the body 112, for example, on a remote server, in the cloud, or in a remote smart phone or other device where image processing is performed remotely. In addition, in certain embodiments, the control system 102 may be disposed within and/or as part of the vehicle modules 108, drive system 118, and/or within and/or or as part of one or more other vehicle systems. Also, as depicted in FIG. 1, in various embodiments the control system 102 is coupled to the vehicle modules 108 via the vehicle communication bus 110, and is further coupled to the peer network 104.

As depicted in FIG. 1, the control system 102 includes various sensors 122, a sensor interface 124, a transceiver 126, and a controller 128. In various embodiments, the sensors 122 include one or more pedestrian detection sensors (122'), one or more vehicle detection sensors (122"), ultrasonic sensors, radar sensors, infrared sensors, engine control sensors, and/or various other sensors pertaining to the various modules 108 and/or operation of the vehicle 100. In various embodiments, the sensor interface 124 facilitates communications between the sensors 122 and the controller 128.

In various embodiments, the pedestrian detection sensor 122' can be one or more wide lens or ultra-wide lens cameras mounted around the front portion of body 112 to capture images of portions of the vehicle environment which lies in front of vehicle 100. For example, one or more of the cameras 122' can be mounted at some point along the front bumper 113 and face away from the vehicle 100 so as to provide a view of the environment directly in front of vehicle 100. As follows, these cameras 122' can be angled such that they can capture images of a pedestrian/animal as they are walking/jogging/standing at a location somewhere out in front of the bumper and crossing the path of vehicle 100. In addition, one or more of the cameras 122' can also be mounted at the front portion of the vehicle's roof and angled to capture an image of a pedestrian crossing out front of the vehicle 100.

In various embodiments, the pedestrian detection sensor 122' can be one or more ultrasonic sensors positioned around the vehicle and angled to detect when a large object such as a pedestrian or animal (e.g., dog or cat) when they are crossing the vehicle's path. In various embodiments, the pedestrian detection sensor 122' can be one or more other types of sensors (radar/lidar/sonar sensors) positioned around the vehicle and angled to detect when a large object, such as a pedestrian or animal (e.g., dog or cat), when they are crossing the vehicle's path (walking/jogging/running). It should be understood that the pedestrian detection sensor 122' can also detect various other objects/people/animals moving in front of the vehicle's path such as bicyclists, other vehicles, deer, moose, Canadian geese, skateboarders, roller skaters, scooter riders, moped riders, etc.

In various embodiments, the vehicle detection sensor 122" can be one or more wide lens or ultra-wide lens cameras mounted around the rear portion body 112 to capture images of portions of the vehicle environment that lies behind vehicle 100 (e.g., a generally-known backup camera). For example, one or more of the cameras 122" can be mounted at some point along the back bumper 115 and face away from the vehicle 100 so as to provide a view of at least part of the environment directly behind vehicle 100. As follows, these cameras 122" can be angled such that they can capture images of another third-party vehicle 207 (FIG. 3) as it is attempting to pass by one side of the vehicle 100. In addition, one or more of the cameras 122" can also be mounted at the rear portion of the vehicle's roof/trunk door/cargo area door and angled to capture an image of the third-party vehicle 207 as it is attempting to pass along the side of vehicle 100. In various embodiments, the vehicle detection sensor 122" can be one or more ultrasonic sensors positioned around the backend of vehicle 100 and angled to detect when the third-party vehicle 207 is attempting to go past vehicle 100. In various embodiments, the vehicle detection sensor 122" can be one or more other types of sensors (radar/lidar/sonar sensors) positioned around the backside of vehicle 100 and angled to detect when the third-party vehicle 207 is attempting to go past vehicle 100. It should be understood that the third-party vehicle 207 may be considered an automobile (having all the systems and configurations as discussed herein) or it can be considered anything else used for transporting people or goods such as, but not limited to, a bicycle (with a rider), motorcycle (with a rider), moped (with a rider), truck, cart, train, bus, skateboard (with a rider), and scooter (with a rider).

In various embodiments, the transceiver 126 facilitates and provides communications between the vehicle 100 and the peer network 104. For example, in various embodiments, the transceiver 126 provides communications (e.g., including data pertaining to operation of the vehicle 100 and/or including recommendations for the vehicle 100 as well as GPS data pertaining to the location of the vehicle) to the peer network 104 (e.g., from one or more other network participants 106). Transceiver 126 can also provide these communications with peer network 104 through one or more known short-range protocols such as, for example, WI-FI, Bluetooth, or through one or more known long-range protocols using a wireless carrier system (e.g., a cellular communications system) such as, for example, 4G LTE or 5G. In certain embodiments, the transceiver 126 may also receive, provide, and/or facilitate communications between the controller 128 and the sensors 122 and/or vehicle modules 108. In various embodiments, the transceiver 126 may include a single transceiver and/or multiple transceivers, and may include one or more similar devices such as one or more receivers, transmitters, and/or communication modules (which will collectively be referred to as a "transceiver" for the purposes of this Application).

The controller 128 controls operation of the control system 102, and the communications with the peer network 104. In various embodiments, the controller 128 is coupled to the sensors 122 (e.g., via the sensor interface 124), the transceiver 126, the vehicle modules 108 (e.g., via the vehicle bus 110), and to the peer network 104. In various embodiments, the control system 102 receives data from the sensors 122, the vehicle modules 108, and the peer network 104, processes the data, controls vehicle actions using the data via the vehicle modules 108, and controls the vehicle 100's communications with the peer network 104. In various embodiments, the controller 128 provides these and other functions in accordance with the steps of the processes discussed further below in connection with FIG. 2.

Also in one embodiment, the controller 128 is disposed within the control system 102, within the vehicle 100. In certain embodiments, the controller 128 (and/or components thereof, such as the processor 130 and/or other components) may be part of and/or disposed within one or more other vehicle components. Also in certain embodiments, the controller 128 may be disposed in one or more other locations of the vehicle 100. In addition, in certain embodiments, multiple controllers 128 may be utilized. In addition, in certain embodiments, the controllers 128 can be placed outside the vehicle, such as in a remote server, in the cloud or on a remote smart device.

As depicted in FIG. 1, the controller 128 comprises a computer system. In certain embodiments, the controller 128 may also include one or more of the sensors 122, the transceiver 126, one or more components thereof, and/or one or more other components of the vehicle 100. In addition, it will be appreciated that the controller 128 may otherwise differ from the embodiment depicted in FIG. 1. For example, the controller 128 may be coupled to or may otherwise utilize one or more remote computer systems and/or other control systems, for example as part of one or more of the above-identified vehicle 100 devices and systems.

In the depicted embodiment, the computer system of the controller 128 includes a processor 130, a memory 132, an interface 134, a storage device 136, and a bus 138. The processor 130 performs the computation and control functions of the controller 128, and may comprise any type of processor or multiple processors, single integrated circuits such as a microprocessor, or any suitable number of integrated circuit devices and/or circuit boards working in cooperation to accomplish the functions of a processing unit. During operation, the processor 130 executes one or more programs 140 contained within the memory 132 and, as such, controls the general operation of the controller 128 and the computer system of the controller 128, generally in executing the processes described herein, such as the processes discussed further below in connection with FIG. 2. While the processor 130 is depicted in FIG. 1 as being part of the controller 128, it will be appreciated that in certain embodiments the processor 130 (and/or one or more additional processors) may also be part of various other vehicle components, such as (by way of example) one or more vehicle modules 108 (e.g., an engine control unit), sensors 122, drive system 118, transceiver 126, and so on.

The memory 132 can be any type of suitable memory. For example, the memory 132 may include various types of dynamic random-access memory (DRAM) such as SDRAM, the various types of static RAM (SRAM), and the various types of non-volatile memory (PROM, EPROM, and flash). In certain examples, the memory 132 is located on and/or co-located on the same computer chip as the processor 130. In the depicted embodiment, the memory 132 stores the above-referenced program 140 along with one or more stored values 142.

The bus 138 serves to transmit programs, data, status and other information or signals between the various components of the computer system of the controller 128. The interface 134 allows communication to the computer system of the controller 128, for example from a system driver and/or another computer system, and can be implemented using any suitable method and apparatus. In one embodiment, the interface 134 obtains the various data from the sensors 122, vehicle modules 108, and/or transceiver 126. The interface 134 can include one or more network interfaces to communicate with other systems or components. The interface 134 may also include one or more network interfaces to communicate with technicians, and/or one or more storage interfaces to connect to storage apparatuses, such as the storage device 136.

The storage device 136 can be any suitable type of storage apparatus, including various different types of direct access storage and/or other memory devices. In one exemplary embodiment, the storage device 136 comprises a program product from which memory 132 can receive a program 140 that executes one or more embodiments of one or more processes of the present disclosure, such as those set forth in FIG. 2 and discussed below. In another exemplary embodiment, the program product may be directly stored in and/or otherwise accessed by the memory 132 and/or a disk (e.g., disk 144), such as that referenced below.

The bus 138 can be any suitable physical or logical means of connecting computer systems and components. This includes, but is not limited to, direct hard-wired connections, fiber optics, infrared and wireless bus technologies. During operation, the program 140 is stored in the memory 132 and executed by the processor 130.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 130) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 128 may also otherwise differ from the embodiment depicted in FIG. 1, for example in that the computer system of the controller 128 may be coupled to or may otherwise utilize one or more remote computer systems and/or other control systems.

Method

Figure 2:
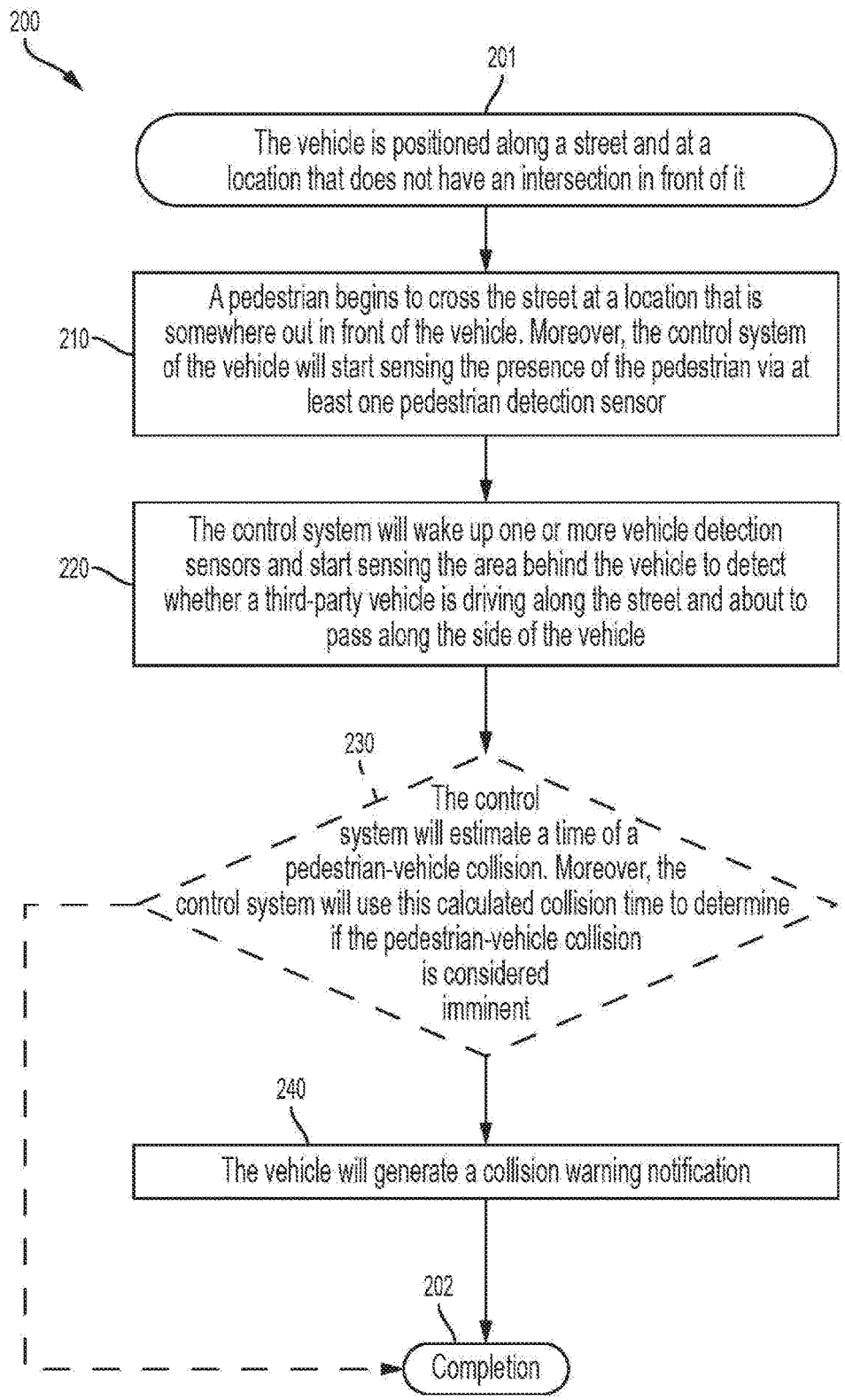
FIG. 2 is a flowchart of an exemplary process to mitigate the likelihood of a pedestrian collision.

Now turning to FIG. 2, there is shown an embodiment of a method 200 to mitigate the likelihood of a pedestrian collision. One or more aspects of notification method 200 may be completed through control system 102 which may include a processor 130 to execute one or more programs contained electronic memory 132. One or more ancillary aspects of method 200 may be completed by the pedestrian detection sensor 122', vehicle detection sensor 122", and one or more vehicle modules 108 such as the vehicle headlamps, braking control system, and horn system. One or more ancillary aspects of method 200 may also be completed by transceiver 126 (e.g., to transmit a V2X message). These configurations may be established by a manufacturer at or around the time of the vehicle's assembly.

Method 200 begins at 201 in which the vehicle 100 is positioned along a street 205 (e.g., parked, idling, moving, etc.) and at a location that does not have an intersection positioned anywhere near the front of the vehicle 100. Control system 102 will also wake up the pedestrian detection sensors 122' for the purposes of sensing pedestrians out front of the vehicle 100. Control system 102 may also activate transceiver 126 to attain the vehicle's location so as to ensure that the vehicle 100 is actually parked at a street location that does not have a nearby intersection.

In step 210, at some point in time after method 200 has begun, a pedestrian 206 will begin to cross the street 205 at a location that is somewhere out in front of the vehicle 100 (e.g., within 3 meters of the front bumper 113). When this happens, with additional reference to FIG. 3, the control system 102 will start sensing the presence of this pedestrian 206 through one or more of the pedestrian detection sensors 122'. For example, when at least one of the pedestrian detection sensors 122' is a camera, the control system 102 will sense the presence of the pedestrian 206 and implement object detection software to recognize that the pedestrian is moving in such a way that they are about to move across the street 205. Alternatively, when multiple pedestrian detection sensors 122' are ultrasonic sensors, the control system 102 will sense the presence of an object that is approximately the size of the typical pedestrian 206 and sense this object's trajectory as it moves along the sensing areas of each ultrasonic sensor so as to recognize that the object is about to move across the street 205. It should be understood that the pedestrian can be a human crossing the street 205; however, the pedestrian can also be any other animal/object crossing the street 205 (discussed above) such as, for example, bicyclists, other vehicles, deer, moose, Canadian geese, skateboarders, roller skaters, scooter riders, and moped riders.

Control system 102 may also, at least temporarily, store this pedestrian movement information onto storage device 136 for retrieval at a later time (e.g., for evidence collection in the case of an accident). Control system 102 may further use this pedestrian movement information to calculate the velocity at which this pedestrian is moving (e.g., 2.5-3 mph) using any embodiment of the pedestrian detection sensors 122'. Skilled artists will recognize that other embodiments of the vehicle detection sensors (e.g., lidar, radar, sonar) and combinations thereof can be used detect when a pedestrian is about to cross the street 205 out in front of the vehicle 100.

In step 220, upon sensing the pedestrian's movement, control system 102 will wake up one or more vehicle detection sensors 122" and start sensing the area behind vehicle 100 to detect whether a third-party vehicle 207 (automobile, motorcycle, bicycle, moped, etc.) is driving along the street 205 and about to pass along the side of the street-parked vehicle 100. For example, when at least one of the vehicle detection sensors 122" is a camera, the control system 102 will sense the presence of the third-party vehicle 207 and implement object detection software to recognize that the vehicle is traveling in such a way that it is about to pass along the side of vehicle 100. Alternatively, when multiple vehicle detection sensors 122' are ultrasonic sensors, the control system 102 will sense the presence of an object approximately the size of the typical third-party vehicle 207 and sense this object's trajectory as it travels along the sensing areas of each ultrasonic sensor so as to recognize that the object is about to pass by vehicle 100.

Control system 102 may also, at least temporarily, store this third-party vehicle movement information onto storage device 136 for retrieval at a later time (e.g., for evidence collection purposes). Control system 102 may further use this third-party vehicle movement information to calculate the velocity at which this third-party vehicle 207 is traveling (e.g., 25-30 mph). Skilled artists will recognize that other embodiments of the pedestrian detection sensors (e.g., lidar, radar, sonar) and combinations thereof can be used to detect when a vehicle is about to pass vehicle 100.

In optional step 230, control system 102 will estimate a time of a pedestrian-vehicle collision. For example, when control system 102 has calculated the velocities for both the pedestrian 206 and third-party vehicle 207, the control system 102 will use these velocities to calculate the time and location at which the third-party vehicle 207 is likely to collide with the pedestrian 206. Moreover, the control system 102 will use this calculated collision time to determine if the pedestrian-vehicle collision is considered to be immanent. The collision would, for example, be considered immanent if it is to occur within five (5) seconds or at some other time in which it would be unlikely for the third-party vehicle driver to see the pedestrian 206 and timely brake to avoid collision. Skilled artists will understand that simple Newtonian physics can be used to calculate the time and location of a vehicle-pedestrian collision, as well as whether that collision is going to be immanent. Furthermore, when the pedestrian-vehicle collision is determined to be imminent (e.g., within five (5) seconds), method 200 will move to step 240; otherwise, method 200 will move to completion 202.

Figure 4:
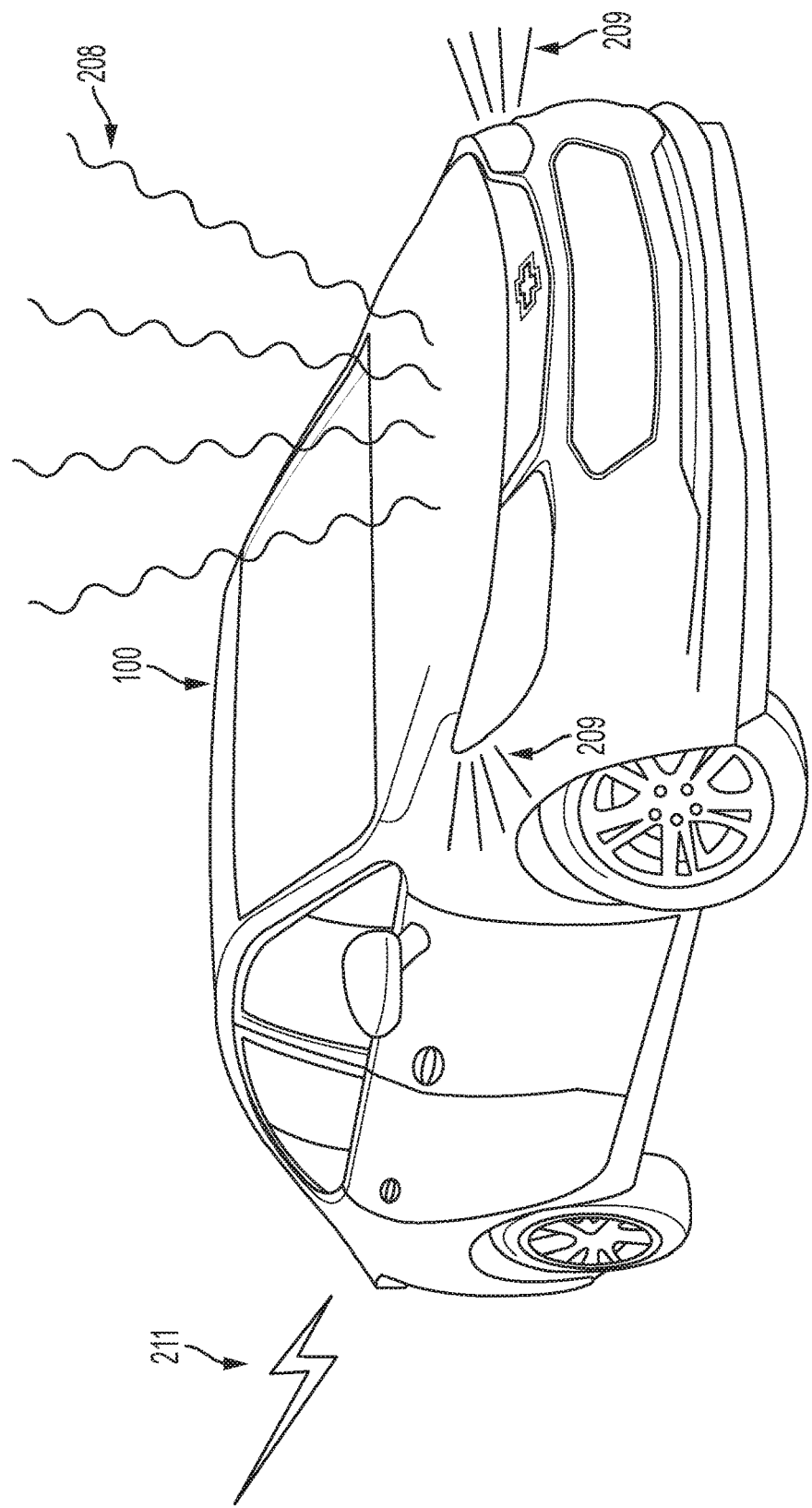
FIG. 4 depicts an application of another exemplary aspect of the process of FIG. 2 in accordance with one or more exemplary embodiments.

In step 240, since a pedestrian-vehicle collision is likely to occur (and it may be immanent), vehicle 100 will generate a collision warning notification. In various embodiments, with additional reference to FIG. 4, this collision warning notification can be an audible alert 208 that is generated by a horn system of a vehicle 100. This audible alert 208 may, for example, be three consecutive short honks from the horn system, which are loud enough in the surrounding vehicle environment to get the attention of the driver of the third-party vehicle 207 as well as startle the pedestrian 206 in an attempt to get them to pay better attention to their surroundings and see the other party. In various embodiment, this collision warning notification can be a visual alert 209 generated by one or more headlamps of a vehicle 100 (e.g., generating the visual alert in either the right-hand or left-hand headlamp or generating the visual alert in both headlamps at the same time). This visual alert 209 may, for example, be three consecutive short light blinks (high or low beam) by either/both headlamps designed to get the attention of the pedestrian 206 in an attempt to get them to pay better attention to their surroundings and see the approaching third-party vehicle 207.

In various embodiments, this collision warning notification can be transmitted to a third-party vehicle via a peer network 104. For example, implementing V2X technology, control system 102 can cause transceiver 126 to send a V2X warning notification 211 to the third-party vehicle 207 over a Wi-Fi protocol (peer network 104). The V2X warning notification 211 can also be sent to an internet connected smart device (e.g., an internet-connected road sign or traffic light or a smart device on the person of pedestrian 206) and can then be relayed to the third-party vehicle 207 over the Wi-Fi protocol. In various embodiments, when the V2X warning notification 211 is received by the third-party vehicle 207, that vehicle's control system can provide the notification in its cabin for the purposes of getting the attention of the driver and causing the driver to look closer at their surroundings and see the pedestrian 206 attempting to cross street 205. This notification provided by the third-party vehicle 207 can also be embodied as vibrations produced by piezoelectric devices implanted in the third-party driver's seat or the steering wheel. This notification can also be embodied as an audio warning (e.g., chimes) produced by the audio system of the third-party vehicle 207. This notification can also be embodied as a visual warning produced by the heads-up-display and/or infotainment unit display of the third-party vehicle 207. Skilled artists will understand producing V2V/V2X notifications via audio systems (e.g., via chime modules), heads-up displays, infotainment unit displays, and vehicle-cabin installed piezoelectric devices is well known in the art. Skilled artists will also see that one or more of these collision warning embodiments (e.g., the auditory warning, visual warning, V2X warning) can be implemented simultaneously or sequentially during step 240. After step 240, method 200 moves to completion 202.

In various embodiments (e.g., when the third-party vehicle 207 is an autonomous automobile, truck, or motorcycle), the V2X warning 211 can also include instructions to automatically brake the third-party vehicle 207. For example, when the V2X warning notification 211 is received, the vehicle's control system 102 will be instructed to cause the vehicle modules 108 to implement vehicle braking such that that third-party vehicle 207 slows down to a safe rate of speed (one (1) mph) such that the pedestrian 206 and third-party vehicle 207 will not collide or, alternatively, the third-party vehicle 207 completely stops. These instructions may moreover cause the third-party vehicle 207 to start back up and continue back on its path once the pedestrian 206 should have sufficiently crossed the street or is at least outside the path of the third-party vehicle 207 (e.g., after some duration of time (one minute—for example) or when the pedestrian detection sensors 122' have recognized the pedestrian is outside of the path of the third-party vehicle 207.

In various embodiments, implementing V2X technology, control system 102 can cause transceiver 126 to send a V2X warning notification 211 to a smart device on the person of pedestrian 206 over a Wi-Fi protocol (peer network 104). As such, when the V2X warning notification 211 is received by a smart phone or smart wearable device on pedestrian 206, the smart device may provide the notification 211 for the purposes of getting the attention of the pedestrian 206 in an attempt to get them to pay better attention to their surroundings and see the third-party vehicle 207. For example, the smart device may provide the V2X warning notification 211 as an audible warning (i.e., a chime alert) that can be heard by the pedestrian 206 or the smart device may provide the V2X warning notification 211 as a vibratory notification (i.e., via piezoelectric devices embedded in the smart device) that can be felt by the pedestrian 206. It should be understood that the V2X warning notification 211 can be sent to other kinds of smart devices (e.g., smart road signs), for those kinds of smart devices to provide the notification 211 so as to attempt to get the attention of the pedestrian 206.

Figure 5:
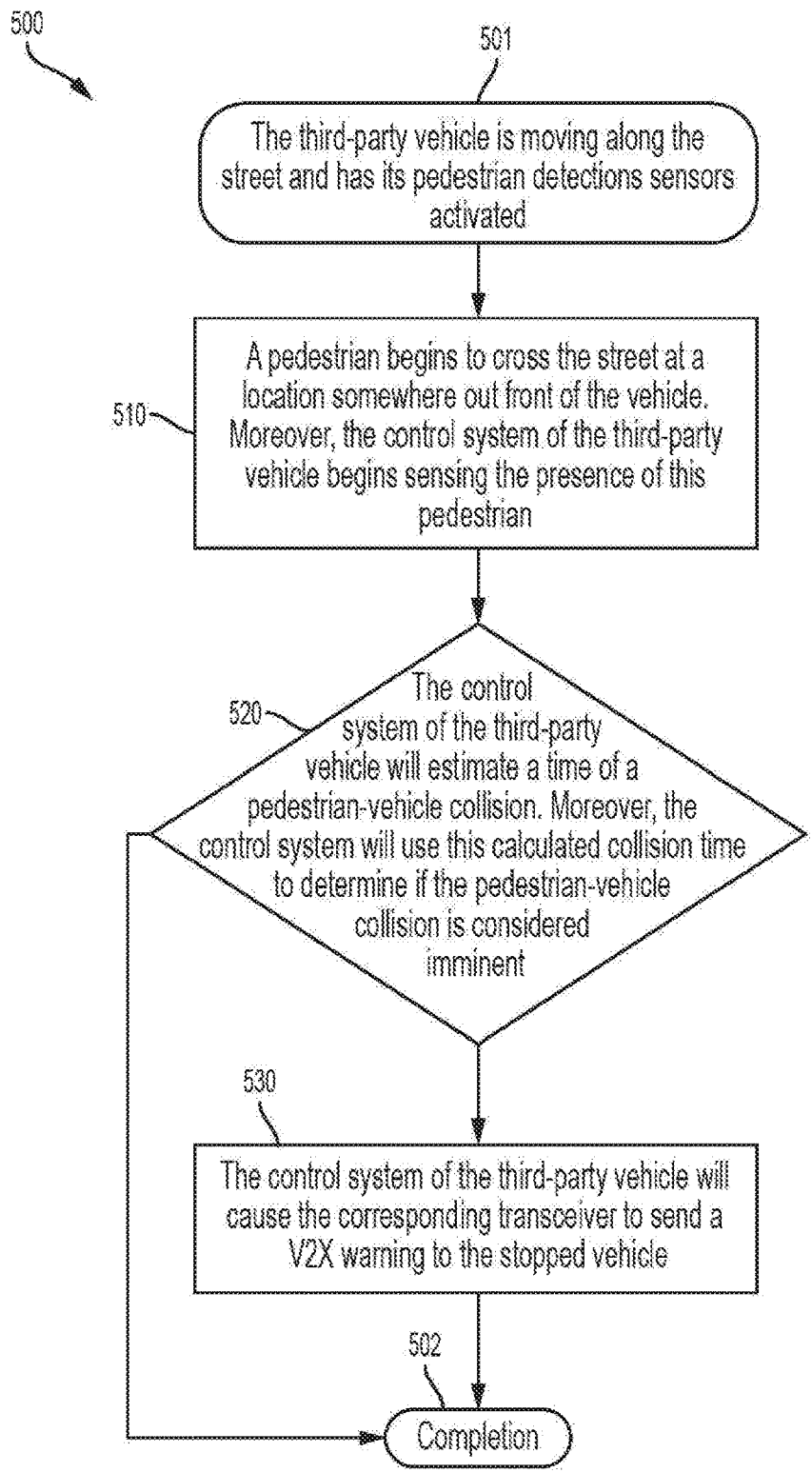
FIG. 5 is a flowchart of another exemplary process to mitigate the likelihood of a pedestrian collision.

Now turning to FIG. 5, there is shown another embodiment of a method 500 to mitigate the likelihood of a pedestrian collision. One or more aspects of notification method 500 may be completed through the control system 102 of both vehicle 100 and third-party vehicle 207, each of which may include a processor 130 to execute one or more programs contained electronic memory 132. One or more ancillary aspects of method 500 may be completed by the pedestrian detection sensor 122' of third-party vehicle 207 and one or more vehicle modules 108 of the vehicle 100 such as the vehicle headlamps and horn system. These configurations may be established by a manufacturer at or around the time of the vehicle's assembly.

Figure 3:
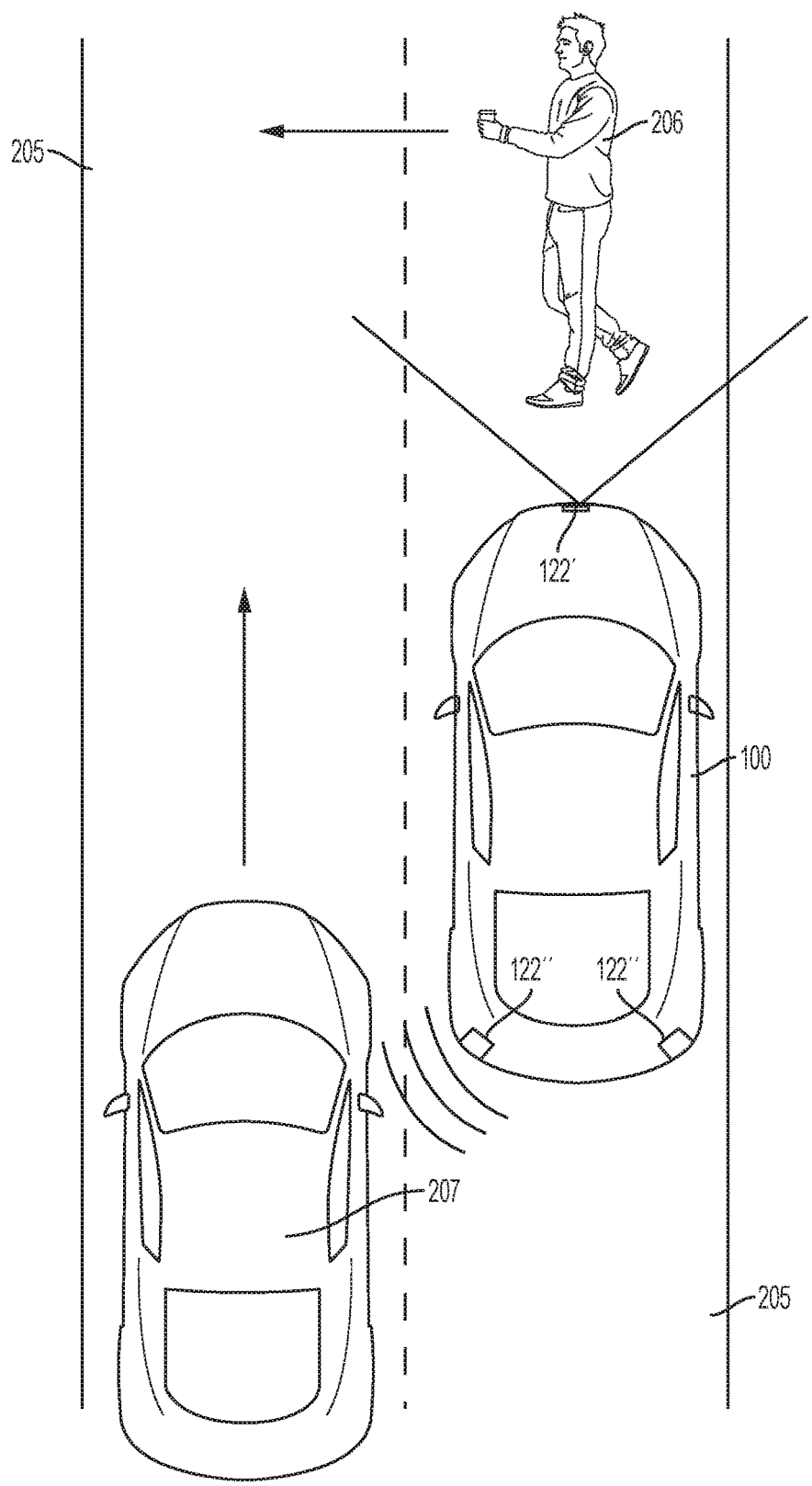
FIG. 3 depicts an application of an exemplary aspect of the process of FIG. 2 in accordance with one or more exemplary embodiments.

Method 500 begins at 501 in which the third-party vehicle 207 is moving along street 205 (FIG. 3). Control system 102 of the third-party vehicle 207 will also have the pedestrian detection sensors 122' activated for the purposes of sensing pedestrians crossing the vehicle's path. In step 510, at some point in time after method 500 has begun, a pedestrian 206 (FIG. 3) will begin to cross the street 205 at a location somewhere out in front of the vehicle 100 (e.g., within 5 meters of its front bumper 113). When this happens, the control system 102 of the third-party vehicle 207 will start sensing the presence of this pedestrian 206 through one or more of the pedestrian detection sensors 122' (as discussed above). The third-party vehicle's control system 102 may also, at least temporarily, store this pedestrian movement information onto storage device 136 for retrieval at a later time (e.g., for evidence collection in the case of an accident).

In step 520, upon sensing the pedestrian's movement, control system 102 will estimate a velocity of the pedestrian 206 and then derive a time of a pedestrian-vehicle collision. For example, when control system 102 has calculated the velocity for the pedestrian 206, the control system 102 will compare this pedestrian velocity to the speed of the third-party vehicle 207 and then calculate the time and location at which the third-party vehicle 207 is likely to collide with the pedestrian 206. Moreover, the control system 102 will use this calculated collision time to determine if the pedestrian-vehicle collision is considered to be immanent. The collision would, for example, be considered immanent if it is to occur sometime between zero (0) and five (5) seconds or at some other time in which it would be unlikely for the third-party vehicle 207 to properly brake in time to avoid collision. Skilled artists will understand that simple Newtonian physics can be used to calculate the time and location of a vehicle-pedestrian collision, as well as whether that collision is going to be immanent. Furthermore, when the pedestrian-vehicle collision is determined to be imminent (e.g., within five (5) seconds), method 500 will move to step 530; otherwise, method 500 will move to completion 502.

In step 530, since a pedestrian-vehicle collision is likely to occur (and it may be immanent), the third-party vehicle's control system 102 will cause transceiver 126 to send a V2X warning notification to the stopped vehicle 100 (FIG. 3) over a Wi-Fi protocol (peer network 104). In various embodiments, as discussed above, this collision warning notification can be an audible alert 208 that is generated by a horn system of the stopped vehicle 100. This audible alert 208 may, for example, be three consecutive short honks from the horn system, which are loud enough in the surrounding vehicle environment to startle the pedestrian 206 in an attempt to get them to pay better attention to their surroundings and see the third-party vehicle 207. In various embodiment, this collision warning notification can be a visual alert 209 generated by one or more headlamps of a vehicle 100 (e.g., right-hand/left-hand headlamp or both headlamps). This visual alert 209 may, for example, be three consecutive short light blinks (high or low beam) by either/both headlamps designed to get the attention of the pedestrian 206 in an attempt to get them to pay better attention to their surroundings and see the approaching third-party vehicle 207. After step 530, method 500 will move to completion 502.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the system and/or method that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

None of the elements recited in the claims are intended to be a means-plus-function element within the meaning of 35 U.S.C. § 112(f) unless an element is expressly recited using the phrase "means for," or in the case of a method claim using the phrases "operation for" or "step for" in the claim.

What is claimed is:

1. A system to send a distress notification, the system comprising:
   a memory configured to comprise one or more executable instructions and a processor configured to execute the executable instructions, wherein the memory and processor are located in a parked vehicle, and wherein the executable instructions enable the processor to:
   receive pedestrian movement information from a pedestrian detection sensor, wherein the pedestrian detection sensor is located at the parked vehicle;
   receive third-party vehicle movement information from a vehicle detection sensor, wherein the vehicle detection sensor is located at the parked vehicle;
   based at least in part on both the pedestrian movement information and third-party vehicle movement information, calculate a time of a pedestrian-vehicle collision; and
   based at least in part on the time of the pedestrian-vehicle collision, provide a collision warning notification.

2. The system of claim 1, further comprising:
   based at least in part on the time of the pedestrian-vehicle collision, the processor will first determine whether the pedestrian-vehicle collision is imminent; and
   wherein the collision warning notification is provided after the pedestrian-vehicle collision is determined to be imminent.

3. The system of claim 1, wherein the collision warning notification is an audible alert generated by a horn system of a vehicle.

4. The system of claim 1, wherein the collision warning notification is a visual alert generated by one or more headlamps of a vehicle.

5. The system of claim 1, wherein the collision warning notification is transmitted to a third-party vehicle via a peer network.

6. The system of claim 5, wherein the collision warning notification comprises instructions configured to automatically brake the third-party vehicle.

7. The system of claim 1, wherein the executable instructions further enable the processor to attain a location of the parked vehicle to ensure that the parked vehicle is parked along a street that does not have an intersection.

8. The system of claim 1, wherein:
   the pedestrian detection sensor is a camera; and
   wherein the executable instructions further enable the processor to implement an object detection technique to recognize that the pedestrian movement information includes a pedestrian is moving in such a way that they are about to move across a street in front of the parked vehicle.

9. The system of claim 1, wherein:
   the vehicle detection sensor is a camera; and
   wherein the executable instructions further enable the processor to implement an object detection technique to recognize that a third-party vehicle is about to move along a side of the parked vehicle.

10. The system of claim 5, wherein the collision warning notification is sent to a smart device and then relayed to the third-party vehicle via the peer network.

11. A vehicle comprising a control system, wherein the vehicle is parked along a street, the control system configured to:
    receive pedestrian movement information from a pedestrian detection sensor, wherein the pedestrian detection sensor is located at the parked vehicle;
    receive third-party vehicle movement information from a vehicle detection sensor, wherein the vehicle detection sensor is located at the parked vehicle; and
    based at least in part on both the pedestrian movement information and third-party vehicle movement information, calculate a time of a pedestrian-vehicle collision;
    based at least in part on the time of the pedestrian-vehicle collision, determine whether the pedestrian-vehicle collision is imminent; and
    when the pedestrian-vehicle collision is determined to be imminent, provide a collision warning notification.

12. The vehicle of claim 11, wherein the collision warning notification is an audible alert generated by a horn system of the vehicle.

13. The vehicle of claim 11, wherein the collision warning notification is a visual alert generated by one or more headlamps of the vehicle.

14. The vehicle of claim 11, wherein the collision warning notification is transmitted to a third-party vehicle via a peer network.

15. The vehicle of claim 14, wherein the collision warning notification comprises instructions configured to automatically brake the third-party vehicle.

16. The vehicle of claim 11, wherein the executable instructions further enable the processor to attain a location of the parked vehicle to ensure that the parked vehicle is parked along a street that does not have an intersection.

17. The vehicle of claim 11, wherein:
the pedestrian detection sensor is a camera; and
wherein the executable instructions further enable the processor to implement an object detection technique to recognize that the pedestrian movement information includes a pedestrian is moving in such a way that they are about to move across a street in front of the parked vehicle.

18. The vehicle of claim 11, wherein:
the vehicle detection sensor is a camera; and
wherein the executable instructions further enable the processor to implement an object detection technique to recognize that a third-party vehicle is about to move along a side of the parked vehicle.

19. The vehicle of claim 14, wherein the collision warning notification is sent to a smart device and then relayed to the third-party vehicle via the peer network.

* * * * *